US006950241B1

(12) United States Patent
Liang

(10) Patent No.: US 6,950,241 B1
(45) Date of Patent: Sep. 27, 2005

(54) MINIATURE MICROSCOPE OBJECTIVE FOR AN ARRAY MICROSCOPE

(75) Inventor: Chen Liang, Tucson, AZ (US)

(73) Assignee: DMetrix, Inc., Tucson, AZ (US)

( * ) Notice: Subject to any disclaimer, the term of this patent is extended or adjusted under 35 U.S.C. 154(b) by 1 day.

(21) Appl. No.: 10/681,594

(22) Filed: Oct. 8, 2003

Related U.S. Application Data

(63) Continuation-in-part of application No. 10/300,679, filed on Nov. 20, 2002, and a continuation-in-part of application No. 10/247,811, filed on Sep. 18, 2002.

(51) Int. Cl.[7] .............................................. G02B 21/02
(52) U.S. Cl. ...................................... 359/660; 359/661
(58) Field of Search ................................ 359/656–661

(56) References Cited

U.S. PATENT DOCUMENTS

| 4,326,779 | A | | 4/1982 | Rybicki et al. |
| 4,721,372 | A | * | 1/1988 | Yokota ........................ 359/658 |
| 5,274,503 | A | * | 12/1993 | DeJager ...................... 359/657 |
| 5,287,218 | A | | 2/1994 | Chen |
| 5,555,479 | A | | 9/1996 | Nakagiri |
| 5,581,405 | A | | 12/1996 | Meyers et al. |
| 5,691,847 | A | | 11/1997 | Chen |
| 5,889,618 | A | | 3/1999 | Fukutake |
| 6,040,943 | A | | 3/2000 | Schaub |
| 6,069,743 | A | | 5/2000 | Nagata et al. |
| 6,388,819 | B1 | * | 5/2002 | Leidig ........................ 359/716 |
| 6,529,336 | B1 | | 3/2003 | Kreitzer |

FOREIGN PATENT DOCUMENTS

| EP | 0807840 | 11/1997 |
| WO | WO 03/025838 A1 | 3/2003 |

OTHER PUBLICATIONS

C. Puech, P.J. Rogers, J. Rollin and A. Hornaug, "Diffractive Optics in the Thomson Group," Proceedings of the SPIE, vol. 3482, pps. 454-465 (1998).

Zhou, Haixian, "Diffractive Objective in Night Vision Goggle," Proceedings of the SPIE, vol. 3482, pp. 887-896 (1998).

Yang, Guoguang, "An optical pickup using a diffractive optical element for a high-density optical disc," Optics Communications 159 (1999) pp. 19-22.

Greisukh, G.I. and Stepanov, S.A., "Correction possibilities of a hybrid lens consisting of two diffractive lenses and a cemented Wood lens," Journal of Optical Technology 67 (10), Oct. 2000, pp. 896-899.

(Continued)

*Primary Examiner*—Scott J. Sugarman
(74) *Attorney, Agent, or Firm*—Birdwell & Janke, LLP

(57) ABSTRACT

A miniature microscope objective includes at least three or four miniature lenses including from object to image at least a first positive lens, a second positive lens, and a third lens. The numerical aperture (NA) is greater than 0.4 and no more than approximately 0.9. The magnification variation $\Delta M/M$ over red, green and blue wavelengths spanning 165 nm or more is less than 0.3% to 1.5%, an image size variation is less than a sampling distance, at least one lens has an aspheric departure, and the miniature objective includes at least one diffractive surface.

52 Claims, 10 Drawing Sheets

Optical layout of the microscope objective design of present invention.

OTHER PUBLICATIONS

Greisukh, G.I. and Stepanov, S.A., "High-resolution diffraction-gradient objective," Journal of Optical Technology 68 (3), Mar. 2001, pp. 212-215.

Li, Wenjun, "Hybrid diffractive refractive broad-band design in visible wavelength region," Proceedings of the SPIE, vol. 2689, (1996) pp. 101-111.

Maruyama, Koichi; Iwaki, Makoto; Wakayima, Syun'Itirou and Ogawa, Ryoto, "A Hybrid Achromatic Objective Lens for Optical Data Storage," Proceedings of SPIE, vol. 2577, (1995), pp. 123-129.

Zhou, Haixian, "Diffractive Objective in Night Vision Goggle," Proceedings of the SPIE, vol. 3482, (1998), pp. 887-896.

Puech, C., Rogers, P.J., Rollin, J. and Hornung, A, "Diffractive Optics in the Thomson Group," Proceedings of the SPIE, vol. 3482, (1998), pp. 454-465.

* cited by examiner

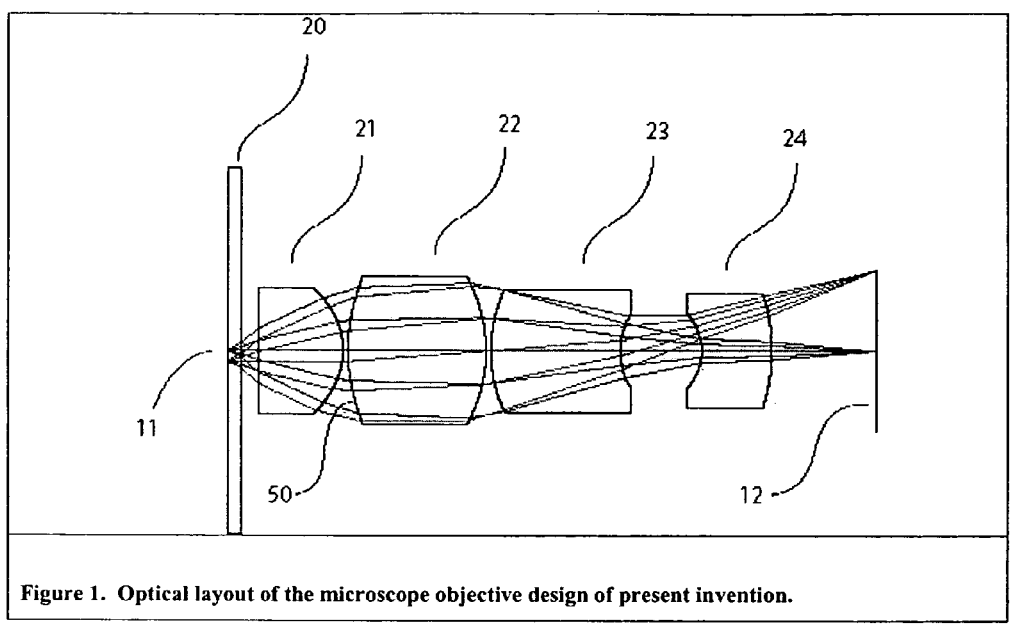
Figure 1. Optical layout of the microscope objective design of present invention.

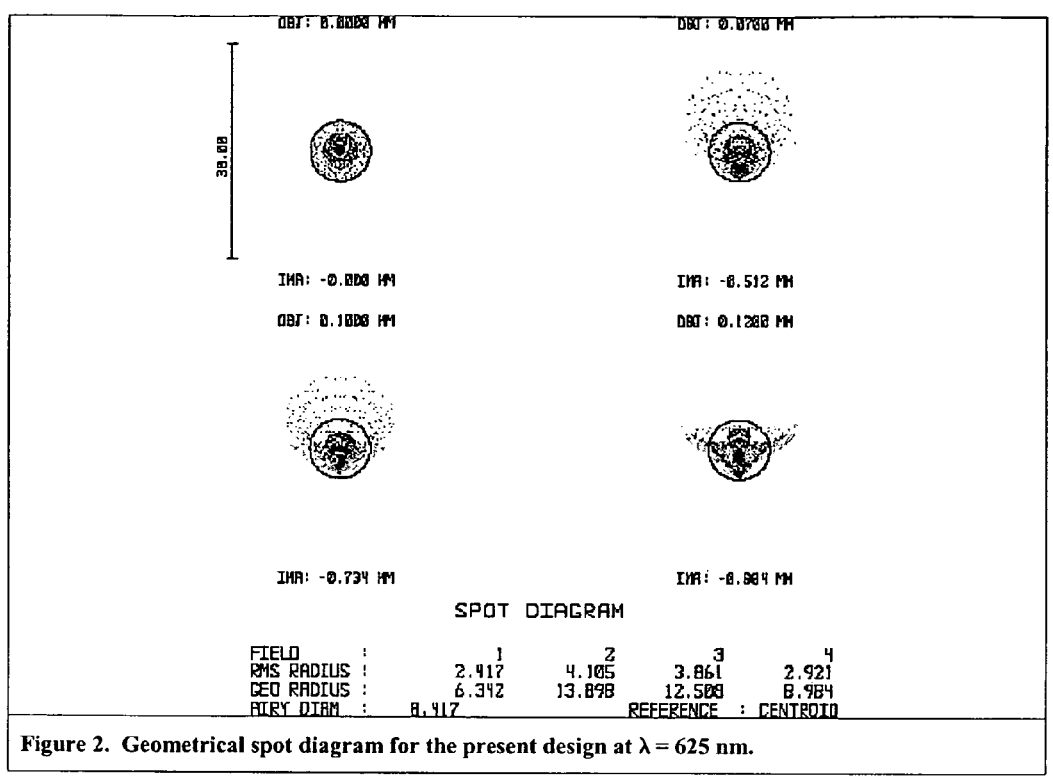
Figure 2. Geometrical spot diagram for the present design at λ = 625 nm.

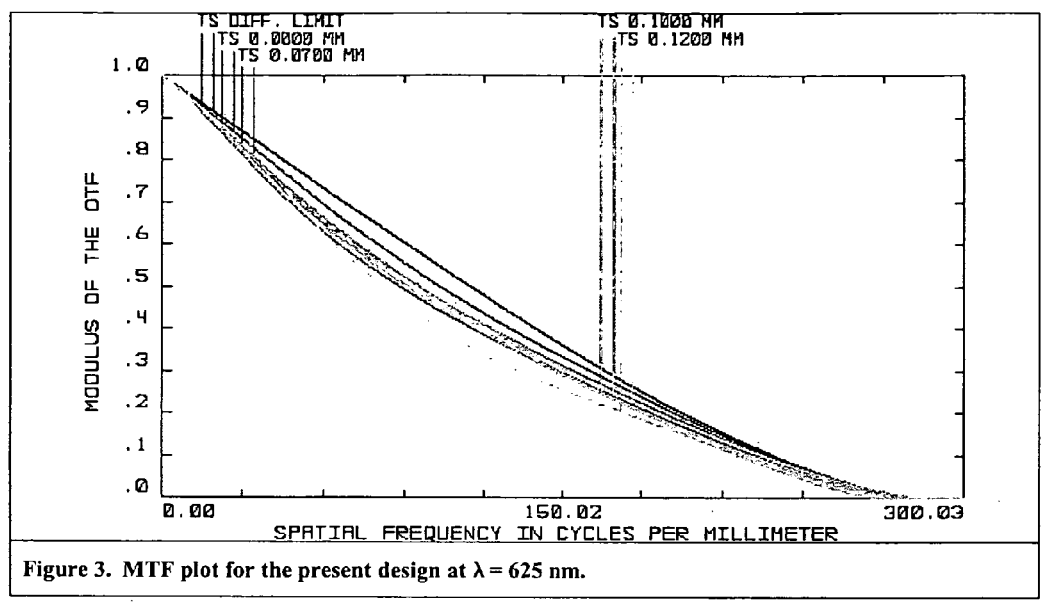
Figure 3. MTF plot for the present design at λ = 625 nm.

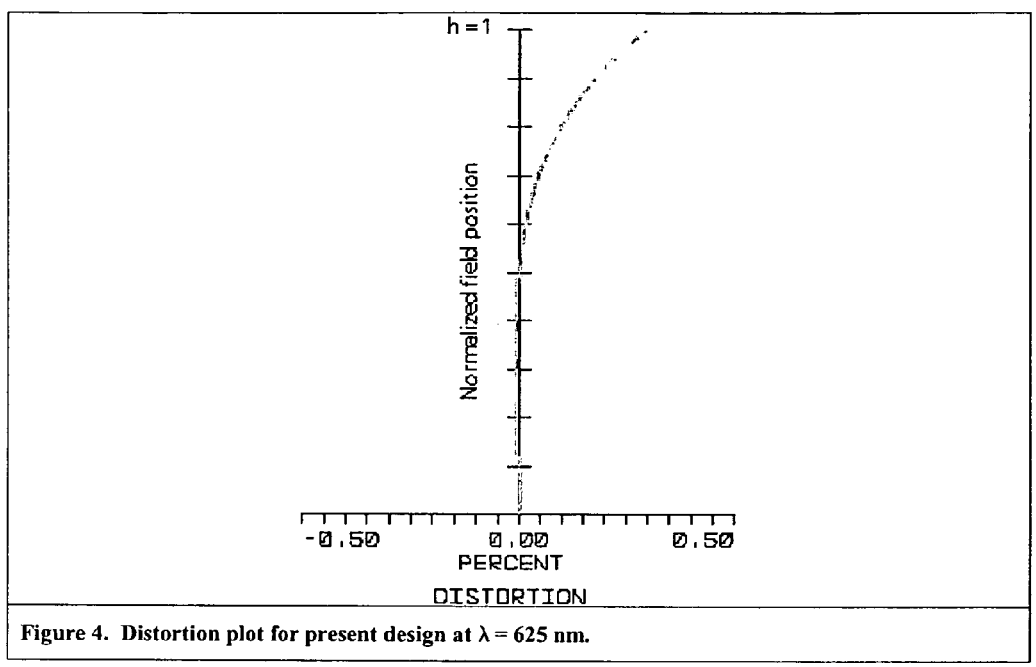
Figure 4. Distortion plot for present design at λ = 625 nm.

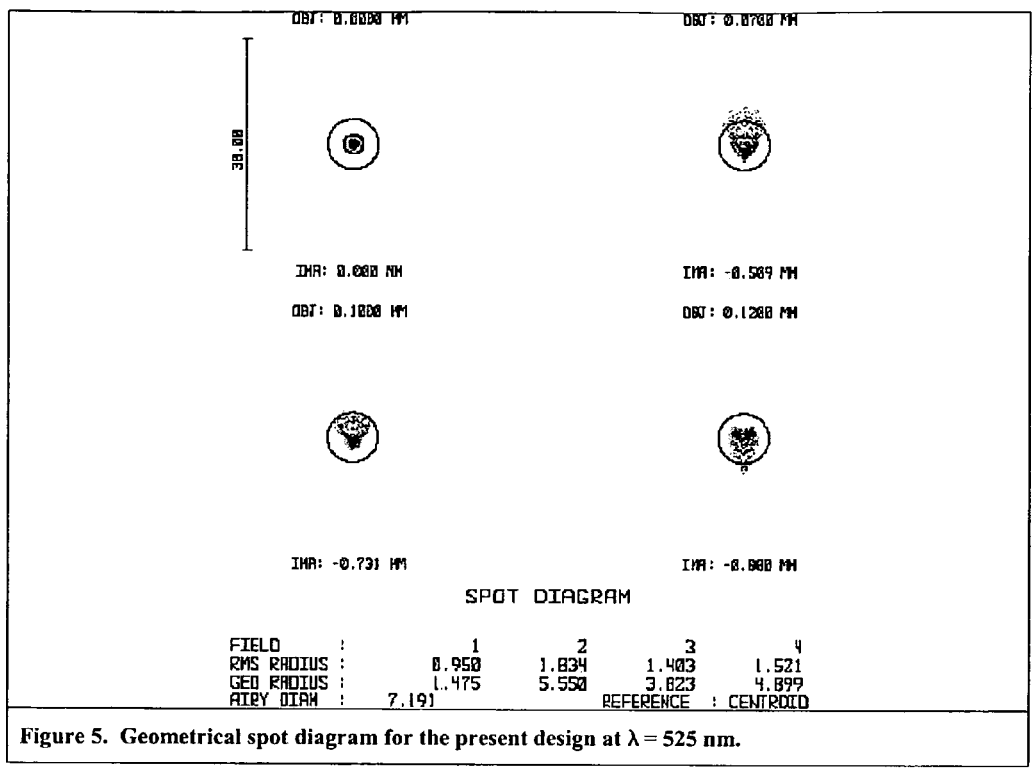
Figure 5. Geometrical spot diagram for the present design at λ = 525 nm.

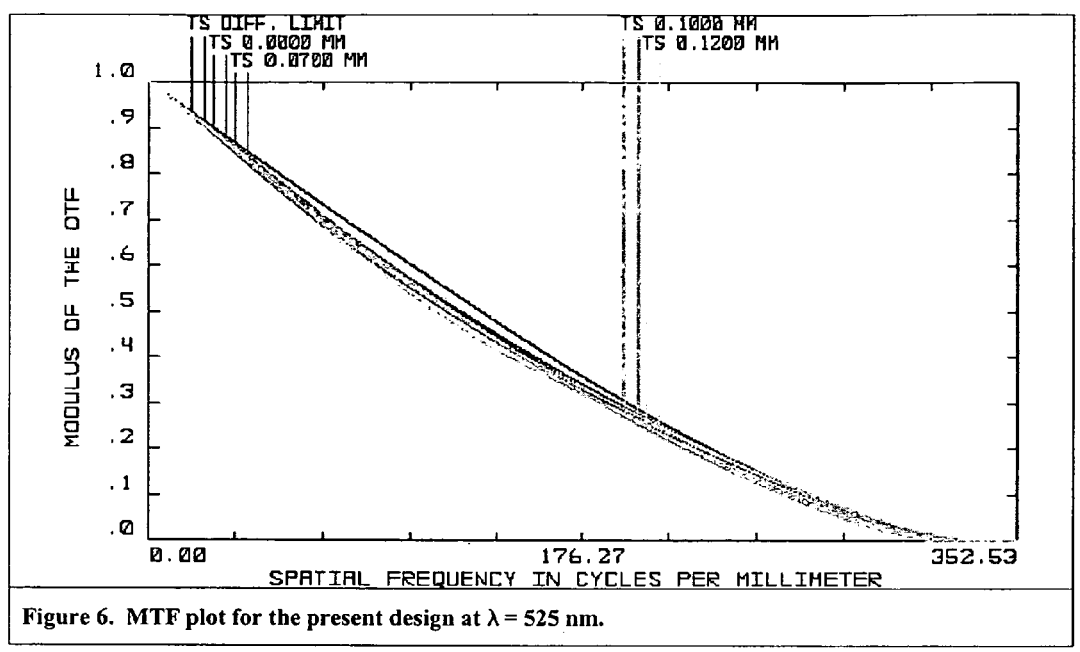
Figure 6. MTF plot for the present design at λ = 525 nm.

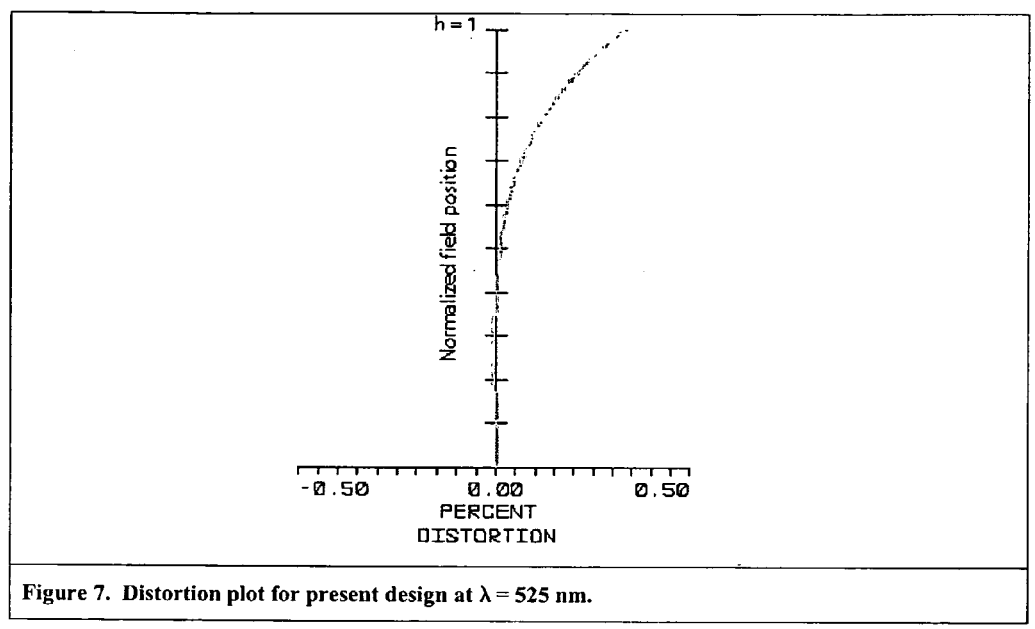
Figure 7. Distortion plot for present design at λ = 525 nm.

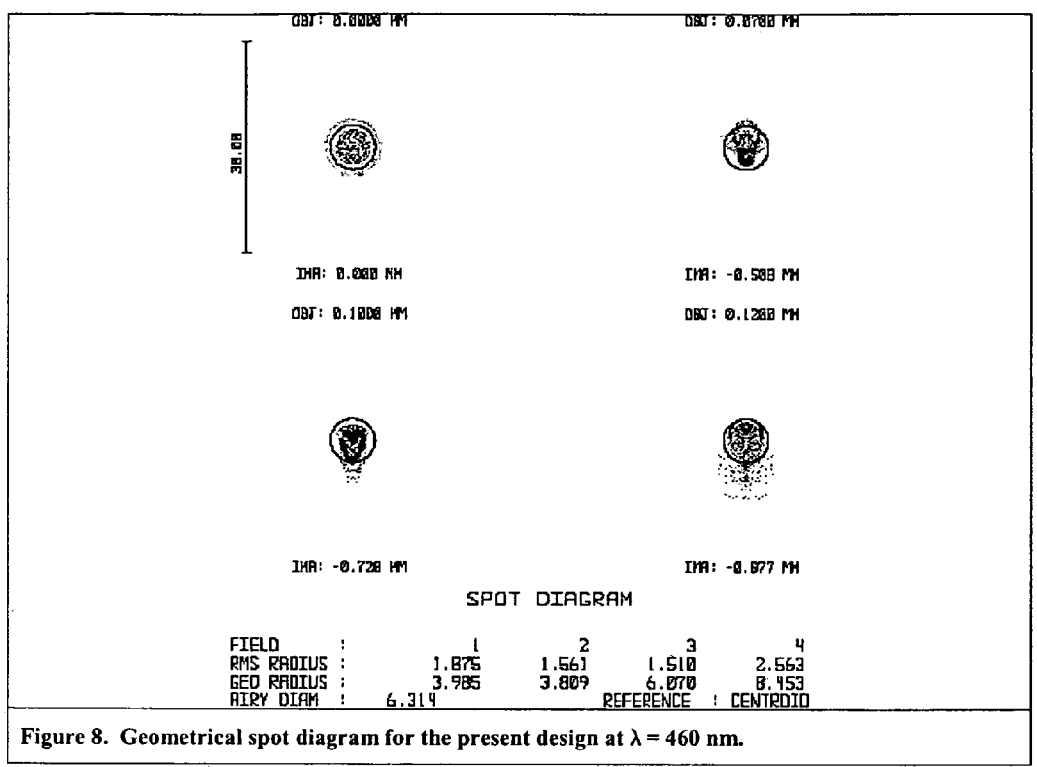
Figure 8. Geometrical spot diagram for the present design at λ = 460 nm.

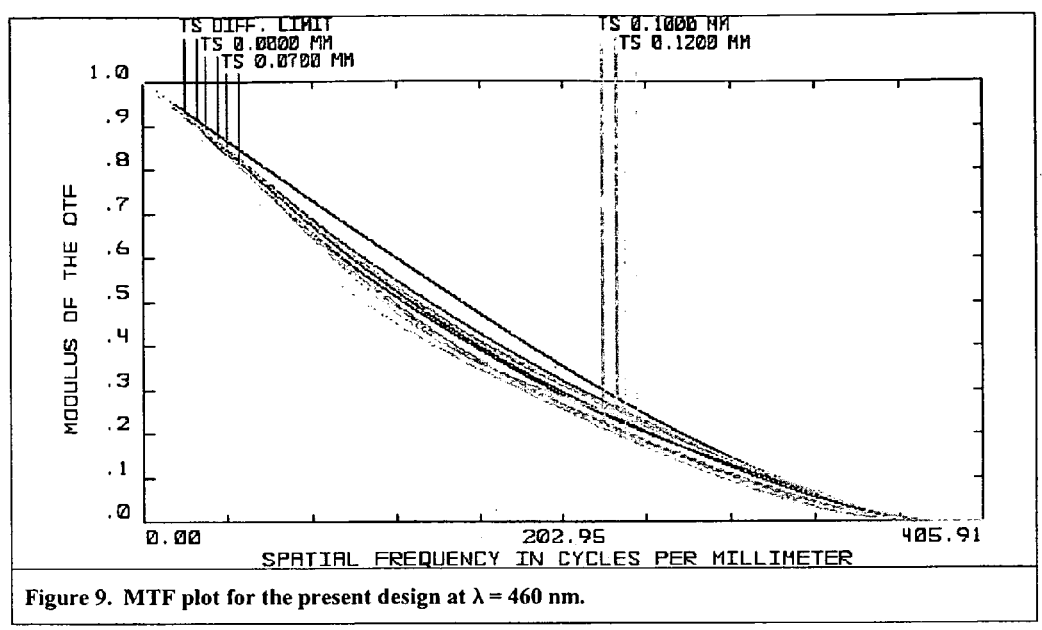
Figure 9. MTF plot for the present design at λ = 460 nm.

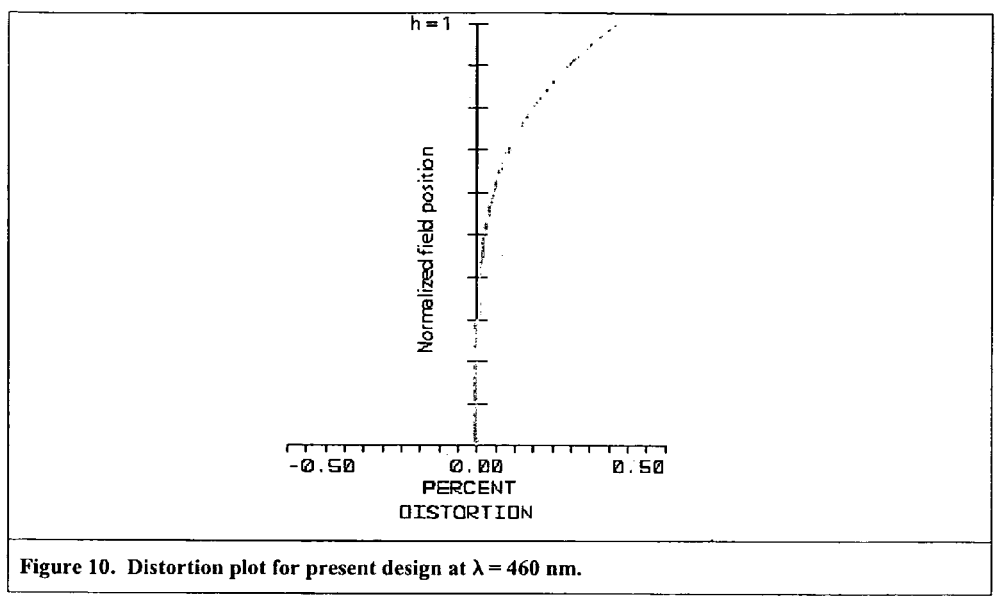
Figure 10. Distortion plot for present design at λ = 460 nm.

US 6,950,241 B1

MINIATURE MICROSCOPE OBJECTIVE FOR AN ARRAY MICROSCOPE

PRIORITY

This application is a continuation-in-part of U.S. patent application Ser. No. 10/247,811, filed Sep. 18, 2002, and this application is also a continuation-in-part of U.S. patent application Ser. No. 10/300,679, filed Nov. 20, 2002, which are each hereby incorporated by reference.

GOVERNMENT INTEREST

The U.S. Government has a paid up license in this invention and the right in limited circumstances to require the patent owner to license others on reasonable terms as provided for the terms of Grant No. 1 R43 EB000958-01 awarded by the National Institute of Biomedical Imaging and Bioengineering.

BACKGROUND

1. Field of the Invention

This invention relates to miniature microscope miniature objectives that are intended to be assembled together into an array microscope including an array of many such miniature objectives.

2. Description of the Related Art

Array microscopes have been previously disclosed, e.g., in PCT patent publication No. WO 02/075370. In addition, miniature microscope objectives intended for assembly together to form an array microscope have also been previously disclosed in U.S. patent application Ser. Nos. 10/247,811 and 10/300,679.

Other miniature microscope miniature objective designs intended to be used individually have been disclosed in a number of publications. Most of such miniature objectives are used for endoscopic instruments. Among them are a miniature microscope miniature objective design by C. Liang, and described in Applied Optics, Vol. 41, No. 22. August 2002, which was particularly intended to be used for a fiber reflectance confocal microscope. A miniature microscope objective was designed by A. Gmitro and authors Sabharwal, et al. and published at Applied Optics, Vol. 38, No. 34, pp. 7133–7144, and was intended for a fluorescent confocal microscope. A further miniature microscope objective design published by authors Knittel et al. at Optics Communications, 188 (2001) 267–273, was also intended to be used for a fluorescent confocal microscope.

It is desired, however, to have a miniature microscope miniature objective designed for an array microscope. Such miniature objective may share some common characteristics as these other miniature microscope miniature objectives, but its design involves a set of first order properties that are unique as recognized in the present invention. It is desired to have a miniature objective design that, as nearly as possible, provides distortion free, diffraction limited image quality over one or more and preferably multiple narrow spectral bands centered at a broad range of visible wavelengths. In addition, it is desired for this miniature objective design to exhibit those properties which permit optimal use of the miniature objective in an array of such miniature objectives.

SUMMARY OF THE INVENTION

In view of the above, a miniature microscope objective for a miniature microscope array is provided including at least three or four miniature lenses with outer diameters less than 5 mm. The lenses include from object to image a first positive lens, a second lens, a third lens, and in the design including at least four lenses, a fourth lens. The objective has a numerical aperture (NA) greater than 0.4 and no more than approximately 0.9.

According to one aspect, over a range of visible wavelengths (l) including blue, green and red wavelengths of approximately 165 nm or more, the miniature objective has a image height or size variation $\Delta h$ of less than substantially a sampling distance in image space, and preferably less than 50%, 25% and 10% of the sampling distance. According to another aspect, the objective includes a diffractive surface such that the miniature objective is corrected over a bandwidth of substantially 100 nm or more. The diffractive surface may be disposed on the front surface of the second lens facing the object, and the second lens may be a positive lens. The diffractive surface may also be disposed on the back of the second lens facing the image. The diffractive surface may also be disposed on the back surface of the third lens facing the image. In the design including at least four lenses, the diffractive surface may also be disposed on the front surface of the fourth lens facing the object. More than one diffractive surface may be included, and the diffractive surfaces may be disposed on surfaces of lenses of the objective.

According to another aspect, at least one surface of the lenses of the miniature objective includes an aspherical surface. The aspherical surface may be a conic surface. The same or another surface of the lenses of the miniature objective may include a higher order aspherical departure. This surface may include a non-zero 4th and/or 6th order aspheric departure coefficient. In the design including at least four lenses, the third and/or fourth lens may be negative, while the third lens is preferably negative in the three lens design. The first lens may be plano-convex or meniscus-type, the second lens may be bi-convex, and the third lens may be meniscus-type. In the design including at least four lenses, the fourth lens may also be meniscus type.

The field of view (FOV) may be substantially 220–240 $\mu$m or more. The outer diameter (OD) of the miniature objective may be substantially 1.6–2.0 mm or less. The ratio of FOV to OD may be 0.11 or more. The numerical aperture (NA) may be substantially 0.6–0.7 or more.

Each lens may comprise a low-dispersion, crown-like material. In addition, distortion may be maintained at less than 0.5% at the all field position.

BRIEF DESCRIPTION OF THE DRAWINGS

FIG. 1 schematically illustrates a miniature microscope objective for an array microscope in accordance with a preferred embodiment.

FIG. 2 shows geometric spot diagrams at $\lambda$=625 nm for the miniature microscope objective design of FIG. 1.

FIG. 3 shows MTF plots at $\lambda$=625 nm for the miniature microscope objective design of FIG. 1.

FIG. 4 shows a distortion plot at $\lambda$=625 nm for the miniature microscope objective of FIG. 1.

FIG. 5 shows geometric spot diagrams at $\lambda$=525 nm for the miniature microscope objective design of FIG. 1.

FIG. 6 shows MTF plots at $\lambda$=525 nm for the miniature microscope objective design of FIG. 1.

FIG. 7 shows a distortion plot at $\lambda$=525 nm for the miniature microscope objective of FIG. 1.

FIG. 8 shows geometric spot diagrams at $\lambda$=460 nm for the miniature microscope objective design of FIG. 1.

FIG. 9 shows MTF plots at λ=460 nm for the miniature microscope objective design of FIG. 1.

FIG. 10 shows a distortion plot at λ=460 nm for the miniature microscope objective of FIG. 1.

INCORPORATION BY REFERENCE

What follows is a cite list of references which are, in addition to those references cited above and below herein, and including that which is described as background, the invention summary, brief description of the drawings, the drawings and the abstract, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the preferred embodiment with the same effect as just described with respect to the following references:

Steven L. Webb, Kevin J. Youngers, Michael J. Steinle, and Joe A. Eccher, "Design of a 600-pixel-per-inch, 30-Bit Color Scanner," Hewlett-Packard Journal, February 1997;

U.S. Pat. Nos. 6,320,174, 6,094,411, 5,260,826, 6,064,529, 6,040,943, 6,023,495, 6,175,655, 5,871,558, 6,150,653, 5,861,113, 6,105,395, 5,976,425, 6,341,180, 6,191,881, 4,190,330, 5,748,371, 6,069,738, 6,201,899, 6,177,980, 6,133,986, 6,154,305, 6,088,145, 6,067,208, 5,742,419, 3,013,467 and 5,499,112;

PCT published applications no. WO 97/34171, WO 09/075,370 and PCT/US02/08286;

U.S. patent applications Nos. 60/318,059, 60/276,498, 60/401,436, 10/247,811,10/158,626, 10/300,679, and serial number not known to Descour et al., entitled, "Multimodal Miniature Microscope, filed Sep. 6, 2002;

United States published patent applications nos. 2003/0067680, 2003/0103262, 2003/0123155, 2001/0006783, and 2003/00108347;

Descour et al., Toward the Development of Miniaturized Imaging Systems for Detection of Pre-Cancer, IEEE Journal of Quantum Electronics, Vol. 38, No. 2 (February 2002);

Liang et al., Design of a high-numerical aperture miniature microscope objective for an endoscopic fiber confocal reflectance microscope, Applied Optics, Vol. 41, No. 22 (Aug. 1, 2002);

Geometrical and Instrumental Optics, Vol. 25, Methods of Experimental Physics, Daniel Malacara, ed., see particularly pp. 67–99 and 158–173, (Academic Press, 1988);

J. M. Sasian, et al., Applied Optics 38, pp. 1163–1168 (1999);

G. H. Rieke, Detection of Light: From the Ultraviolet to the Submillimeter, Ch. 7 (Cambridge University Press, 1994);

R. G. Driggers, et al., Introduction to Infrared and Electro-Optical Systems, Ch. 8 (Artech House, 1999);

Wyrowski and Turner, Diffractive Optics for Industrial and Commercial Applications, John Wiley and Sons;

H. K. Schmidt, Sol-gel and polymer photonic devices, SPIE Critical Review, Vol. CR68, pp. 192–203 (1995);

Rantala et al., Direct patterning of thick hybrid glass film for micro-opto-mechanical structures, Electronics Letters, Vol. 36, pp. 1–2 (2000);

J. R. Benford, Microscope Objectives, Ch. 4 in Applied Optics and Optical Engineering, Vol. III, ed. R. Kingslake (Academic Press, 1965);

D. Malacara, Optical Shop Testing, 2nd edition (Wiley, 1992);

M. Mansuripur, The Principles of Magneto-Optical Recording, Ch. 8, Section 3, pp. 264–277 (Cambridge University Press, 1995); and R. R. Shannon, The Art and Science of Optical Design, (Cambridge University Press, 1997);

G. M. Morris and K. J. McIntyre, "Optical system design with diffractive optics," in Diffractive Optics for Industrial and Commercial Applications, J. Turunen and F. Wyrowski, eds., Ch. 3 (Akademie Verlag, 1997);

D. S. Goodman, "Basic Optical Instruments," Ch. 4 in Geometrical and Instrumental Optics, D. Malacara, ed. (Academic Press, 1988); and M. R. Descour, et al., A ring-toric lens for focus-error sensing in optical data storage, Applied Optics, Vol. 38, No. 8, pp. 1388–1392 (Mar. 10, 1999).

DETAILED DESCRIPTION OF THE PREFERRED EMBODIMENTS

A miniature microscope objective in accordance with a preferred embodiment is schematically illustrated at FIG. 1. A miniature objective is miniaturized in comparison with conventional microscopes objectives. A typical microscope objective may have an outer diameter around, e.g., 25 mmor 32 mm. A miniature microscope objective may have an outer diameter that is 8% to 20% or less than a typical microscope objective, e.g., having an outer diameter of 5 mm or less is a preferred embodiment. In specifically described embodiments below, objectives having outer diameters of less than 2 mm around 1.6 mm are provided. These miniature objectives may be advantageously assembled into arrays of tens of objectives, e.g., into 8×10 arrays. The arrays may be used for scanning biological or other samples including objects that are up to 18 mm across. The objects are then imaged, and the image is sampled and captured by an image detector having a pixel size of, e.g., 3 to 10 microns, which may correspond to a smallest available pixel size depending on the detector used.

The objective preferably includes, from the object plane 11 to the image plane 12, for imaging an object which may be on the other side of a cover glass 20, four lenses 21, 22, 23 and 24. The first lens 21 is preferably a positive lens made of crown-like optical material. The second lens 22 is preferably also a positive lens made of crown-like optical material. These first two lenses provides majority of the optical power. The second lens 22 preferably includes a diffractive surface 50 on one of the lens surfaces, e.g., the front surface 50 facing the object. The third lens 23 is preferably a weakly powered negative lens made of crown-like optical material. The fourth lens 24 is preferably a negative lens also made of crown-like optical material. This fourth lens is largely responsible for correct field curvature. The first lens 21 is towards the object side and the fourth lens 24 is towards the image side and the lenses are separated preferably by air. The present miniature objective design is designed to be used with a 0.15 mm thick cover glass 20, although different cover glasses can be incorporated with corresponding changes in operating conjugate or minor corresponding changes to the lens design.

The first lens 21 is preferably a piano-convex lens with the planar surface facing the object. The second lens 22 is preferably a bi-convex lens having a diffractive surface superimposed on the left or front surface 50 facing the object. The third lens 23 is preferably a meniscus lens and the concave surface is preferably directed towards the image. The fourth lens 24 is also preferably a meniscus lens oriented in the opposite direction as the third lens.

Alternatives include a three lens design of positive, positive and negative lenses from object to image, or PPN. The three lens design may include a positive, preferably piano-convex lens, a positive preferably bi-convex lens, and a negative preferably meniscus lens with convex surface facing the image. Alternative two lens designs (preferably PN), three lens designs (preferably PPN), and four lens designs (preferably PPNN or PPNP) are described in the Ser. Nos. 10/247,811 and 10/300,679 applications incorporated by reference above.

The present miniature objective design is intended to be used in an array microscope and it exhibits characteristics on that behalf (see, e.g., the Ser. No. 10/300,679 application, incorporated by reference above, at FIGS. 5–7 and their corresponding descriptions). The field of view (FOV) of the present miniature objective design is approximately 0.24 mm and the outer diameter is preferably 1.63 mm, or approximately 1.6 mm, which produces an OD-to-FOV ratio of 6.79. The present design has a NA of 0.65 and transverse magnification (M) of −7.2. This kind of OD-to-FOV ratio is suitable for an array microscope of this transverse magnification.

An advantage of the design of FIG. 1, and generally of preferred and alternative embodiments, is a reduction in complexity of the miniature microscope objective design to facilitate low cost fabrication and easy assembly. This is advantageous because the objective design shown here is intended to be used in an array of 80. For the reduction of one lens in the objective design results in a reduction of 80 lenses for the entire array. Such reduction may be achieved in accordance with a preferred embodiment wherein one or more and preferably three or four aspherical surfaces and one or more diffractive surfaces are included in the objective design. Use of these aspherical and diffractive surfaces enables aberration correction with fewer numbers of surfaces compared to a design having only spherical surfaces. The present design also takes advantage of plastic optical materials, such as plastics like cyclo-olefin copolymer (COC) or cyclo-olefin polymer (COP), that can be fabricated at low cost into miniature lenses, e.g., having preferred outer diameters (OD) of 5.0 mm or less, and even particularly preferred outer diameters 2.0 mm or less.

The prescription data for the preferred four lens design is provided in Table 1, below. The object distance and image distance given in Table 1 correspond to operation at a wavelength of $\lambda=625$ nm in the red region of the visible spectrum.

TABLE 1

Prescription data for the miniature microscope miniature objective design of FIG. 1 operating at $\lambda = 625$ nm.

| Surface | Radius | Thickness | Glass | Diameter | Conic | 4th order | 6th order |
|---|---|---|---|---|---|---|---|
| OBJECT | Infinity | 0.150 | 517,642 | 0.240 | 0.000 | | |
| 1 | Infinity | 0.196 | | 4.000 | 0.000 | | |
| 2 | Infinity | 0.913 | 530,559 | 0.765 | 0.000 | | |
| 3 | −0.862 | 0.050 | | 1.383 | −0.234 | | |
| 4 (Diffractive) | 1.791 | 1.500 | 530,559 | 1.623 | 0.000 | −0.072 | −0.002 |
| 5 | −1.548 | 0.050 | | 1.600 | −1.489 | | |
| 6 (Stop) | 1.616 | 1.422 | 530,559 | 1.349 | 0.000 | | |
| 7 | 0.895 | 0.885 | | 0.807 | 2.210 | | |
| 8 | −0.536 | 0.750 | 530,559 | 0.834 | −1.030 | | |
| 9 | −2.132 | 1.142 | | 1.266 | 0.000 | | |
| IMAGE | Infinity | | | 1.776 | 0.000 | | |

In the preferred design, surface #4 has a diffractive surface superimposed on an ashperical surface. The diffractive component on this surface can be specified with $2^{nd}$ order and $4^{th}$ order polynomial terms and a normalization factor. For the present design the normalization factor is 1 and the $2^{nd}$ order term is −459.472 and the $4^{th}$ order term is 51.192. The phase introduced by such diffractive surface can be calculated by, $$\Phi = \sum_{i=1}^{N} M A_i \rho^{2i}. \qquad (1)$$

where M is the diffraction order, $A_i$ is the coefficient on the $2_i^{th}$ power of p, which is the normalized radial aperture coordinate. The physical surface profile of the diffractive component can be calculated base on these coefficients, material, and operating wavelength, by someone skilled in the art. The aspheric coefficients may typically vary by 5% and provide a system of sufficient advantage. Most manufacturers provide lenses having tolerances of +/−5%.

Choosing the Diffractive Surface

The process of choosing the surface to place the diffractive surface involves two steps. The first step is to identify several potential surfaces by eliminating other surfaces based on a set of general rules. The second step is to actually place the diffractive surface on one of those potential surfaces in a real design and/or computer model, perform optimization and examine the results.

For the miniature microscope miniature objective design of the preferred embodiment, three potential surfaces are identified as being advantageous over the others for the placement of the diffractive surface based on the set of rules. The three potential surfaces preferably are: (a) front surface of lens 22, (2) back surface of lens 22, and (3) front surface of lens 23. Although, the front surface of the fourth lens 24 may potentially be alternatively used, the other surfaces are not preferred as potential diffractive surfaces based on the following reasons. The front surface of lens 24 and back surface of lens 24 are generally not as suitable for diffractive surface because the beam footprints for different field positions are significantly separated on these two surfaces. That is, the beam for different field positions will "see" a different diffraction pattern. The front surface of lens 23 and back surface of lens 23 are also generally not as suitable for the placement of a diffractive surface for two reasons. First, the beam footprints for different field positions are still separated although not as much as the two previously mentioned surfaces of the fourth lens 24. Second the clear apertures for these two surfaces are small, and the smaller clear apertures will likely involve smaller diffractive features, which are more difficult to fabricate. The back surface of lens 21 is also not generally suitable for the placement of the diffractive surface, because it has a very steep radius of curvature. From a fabrication perspective, it is easier to place a diffractive surface on a shallow or even flat surface than a steep surface. The back surface of first lens 21 preferably has a steep radius of curvature in a miniature microscope objective design in accordance with a preferred embodiment. Therefore, this surface is not preferred for diffractive surface.

From the three potential surfaces of lenses 22 and 23, the preferred surface for placement of the diffractive surface, based on ZEMAX modeling, is the front surface facing the object of lens 22. The back surface of lens 22 and the front surface of lens 23 are alternatively preferred.

To achieve sufficient image quality from a miniature microscope, the objective of the preferred embodiment is advantageously well corrected for aberrations. The performance of the preferred miniature microscope miniature objective, in terms of aberration correction, can be evaluated through the geometric spot diagrams and MTF plots illustrated at FIGS. 2 and 3 for $\lambda=625$ nm (red), FIGS. 5 and 6 for $\lambda=525$ nm (green), and FIGS. 8 and 9 for $\lambda=460$ nm (blue).

Geometric spot diagrams for the present design at $\lambda=625$ nm are shown in FIG. 2. The RMS spot diameter is 2.8 $\mu$m for on-axis field position and 5.8 $\mu$m for extreme field position. In comparison, for an equivalent diffraction-limited system the Airy Disc diameter is 8.4 $\mu$m. Optical systems designed for imaging are often judged by its MTF. FIG. 3 shows the MTF plot for the present design at $\lambda=625$ nm at four different field positions ranging from on-axis field position to the extreme field position. The MTF plot for an equivalent diffraction-limited system is also shown on the same plot.

Distortion is not an image-blurring aberration, but it causes magnification change at different field positions. If uncorrected, distortion may cause images to appear warped at large field positions. For the present design, distortion is advantageously well corrected. Even at the extreme field position distortion, distortion is kept under approximately 0.5%. The distortion plot is shown in FIG. 4 for $\lambda=625$ nm, in FIG. 7 for $\lambda=525$ nm and in FIG. 10 for $\lambda=460$ nm.

A miniature microscope objective in accordance with a preferred embodiment is corrected for chromatic aberration over a narrow spectral band of approximately 10–20 nm at any center wavelength across the visible spectrum by changing only the object and image distance. With a three or four lens design using only one type of material this kind of correction is difficult to achieve. Therefore, a diffractive surface is used to aid the correction of chromatic nature. To obtain a polychromatic image, the present design will preferably acquire the image at different wavelengths separately, with object and image distances changing between wavelengths, followed by combining them. The object distance and image distance corresponding to green ($\lambda=525$ nm) and blue ($\lambda=460$ nm) may be extracted from the prescription information provided at Table 2 and Table 3 below.

TABLE 2

Prescription data for the miniature microscope miniature objective design of FIG. 1 operating at $\lambda = 525$ nm.

| Surface | Radius | Thickness | Glass | Diameter | Conic | 4th order | 6th order |
|---|---|---|---|---|---|---|---|
| OBJECT | Infinity | 0.150 | 517,642 | 0.240 | 0.000 | | |
| 1 | Infinity | 0.200 | | 4.000 | 0.000 | | |
| 2 | Infinity | 0.913 | 530,559 | 0.765 | 0.000 | | |
| 3 | −0.862 | 0.050 | | 1.383 | −0.234 | | |
| 4 (Diffractive) | 1.791 | 1.500 | 530,559 | 1.623 | 0.000 | −0.072 | −0.002 |
| 5 | −1.548 | 0.050 | | 1.600 | −1.489 | | |
| 6 (Stop) | 1.616 | 1.422 | 530,559 | 1.349 | 0.000 | | |
| 7 | 0.895 | 0.885 | | 0.807 | 2.210 | | |
| 8 | −0.536 | 0.750 | 530,559 | 0.834 | −1.030 | | |
| 9 | −2.132 | 1.128 | | 1.266 | 0.000 | | |
| IMAGE | Infinity | | | 1.771 | 0.000 | | |

TABLE 3

Prescription data for the miniature microscope miniature objective design of FIG. 1 operating at λ = 460 nm.

| Surface | Radius | Thickness | Glass | Diameter | Conic | 4th order | 6th order |
|---|---|---|---|---|---|---|---|
| OBJECT | Infinity | 0.150 | 517,642 | 0.240 | 0.000 | | |
| 1 | Infinity | 0.199 | | 4.000 | 0.000 | | |
| 2 | Infinity | 0.913 | 530,559 | 0.765 | 0.000 | | |
| 3 | −0.862 | 0.050 | | 1.383 | −0.234 | | |
| 4 (Diffractive) | 1.791 | 1.500 | 530,559 | 1.623 | 0.000 | −0.072 | −0.002 |
| 5 | −1.548 | 0.050 | | 1.600 | 1.489 | | |
| 6 (Stop) | 1.616 | 1.422 | 530,559 | 1.349 | 0.000 | | |
| 7 | 0.895 | 0.885 | | 0.807 | 2.210 | | |
| 8 | −0.536 | 0.750 | 530,559 | 0.834 | −1.030 | | |
| 9 | −2.132 | 1.105 | | 1.266 | 0.000 | | |
| IMAGE | Infinity | | | 1.774 | 0.000 | | |

The optical performance varies for green (λ=525 nm) and blue (λ=460 nm) configurations. The spot diagram, MTF plot, and distortion plot for green and blue configurations are shown in FIG. 5 to FIG. 10. The optical performances at these spectral bands is at least comparable to the optical performance at the red spectral band.

As recognized by the inventor in the present invention, this approach of capturing polychromatic images can benefit from having a more constant magnification over the different wavelength. Identical or approximately identical image sizes from different wavelengths can be added together without resealing. Therefore, a design in accordance with a preferred embodiment provides an image size variation over the blue, green and red wavelengths that is less than a sampling distance in the image space. For example, this may be 10 microns or in some detectors around 3 microns. To achieve this, the magnification is preferably constrained to be reasonably constant for different spectral band. One way to specify constant in magnification is to use the ratio of change in magnification over nominal magnification or ΔM/M. The magnification variation ΔM/M is constrained to vary by, at most, the sampling distance divided by the image size. For example, the design described herein according to Tables 1–3 and FIGS. 1–10, has magnification variation ΔM/M of only 0.28% over the visible spectrum. The image size variation at different wavelengths is approximately 2.5 micrometers. The magnification variation can be even less if we are willing to accept slightly decrease in image quality. In which case the object and image distance can be slightly adjusted to optimize more for constant magnification rather than image quality.

The present design is preferably guided by the specific set of design rules for designing miniature microscope miniature objective for array microscope established in application Ser. No. 10/247,811. The field of view (FOV), outer diameter (OD), and magnification (M) of the miniature microscope miniature objective design are preferably chosen to optimize its usability in an array microscope. For example, the selected outer diameter is 1.6 mm, which allows many miniature objectives to be packed together in a small area. The image size is kept small enough so when many miniature objectives are packed closely together in an array the images from the neighboring miniature objectives do not substantially overlap. The image size of present design is approximately 1.77 mm in diameter. In this case, the neighboring miniature objectives can be placed with a center to center distance just slightly over 1.77 mm. For an array microscope, the center-to-center distance between neighboring systems and the outer diameter of the optics is preferred to follow the equation:

$$\text{Center-to-center distance} \approx 112.5\% \text{ OD} \quad (2)$$

Given the image size, the magnification is desired to be small to gain a larger FOV, but at the same time the magnification is desired to be large enough to provide sufficient sampling. Sufficient sampling is dependent on the detector pixel size. For the present design the image size is approximately 1.77 mm, the transverse magnification is approximately −7.2, and the FOV is 0.24 mm. These parameters satisfy the following relationship:

$$m_{obj}(\text{upperlimit}) \approx 1.07 \text{OD/Full FOV} \quad (3)$$

The present miniature microscope miniature objective design does satisfy the envisioned performance standards. Moreover, the preferred objective satisfies standards such that an array of such objectives may be assembled into an array microscope of preferably tens of objectives, e.g., 8×10 objectives.

The specific embodiments described in the specification, drawings, summary of the invention and abstract of the disclosure are not intended to limit the scope of any of the claims, but are only meant to provide illustrative examples of the invention to which the claims are drawn. The scope of the present invention is understood to be encompassed by the language of the claims, and structural and functional equivalents thereof.

What is claimed is:

1. A miniature microscope objective, comprising at least three miniature lenses with outer diameters less than 5 mm and including from object to image at least a first positive lens, a second positive lens, and a third lens, and having a numerical aperture (NA) greater than 0.4 and no more than approximately 0.9, and wherein over a range of visible wavelengths (l) including blue, green and red wavelengths of approximately 165 nm or more, said miniature objective having an image size variation less than an image sampling distance.

2. The miniature objective of claim 1, the miniature objective having a magnification variation ΔM/M of less than substantially 1.5%.

3. The miniature objective of claim 2, the objective including at least four lenses including a fourth lens on the image side of the third lens.

4. The miniature objective of claim 3, further comprising a diffractive surface, wherein the miniature objective is corrected over a bandwidth of more than substantially 10 nm centered at any wavelength over the visible spectrum.

5. The miniature objective of claim 3, wherein over said range of visible wavelengths (λ) including blue, green and red wavelengths of approximately 165 nm or more, said miniature objective having a magnification variation resulting in image size variation less than image sampling distance.

6. The miniature objective of claim 3, at least one of said third and fourth lenses comprising a negative lens.

7. The miniature objective of claim 3, said first lens comprising a plano-convex lens, said second lens comprising a bi-convex lens and said third and fourth lenses comprising meniscus lenses.

8. The miniature objective of claim 2, wherein changes in image size over said range of visible wavelengths are less than 5 microns.

9. The miniature objective of claim 2, wherein a ratio of change in image size to wavelength over said wavelength range is less than 25.

10. The miniature objective of claim 2, wherein at least one surface of said lenses of said miniature objective has a conic departure coefficient of magnitude around 0.2 or more.

11. The miniature objective of claim 10, wherein at least one other surface of said lenses of said miniature objective has a non-zero 4th order aspheric departure coefficient.

12. The miniature objective of claim 11, wherein said at least one other surface has a non-zero 6th order aspheric departure coefficient.

13. The miniature objective of claim 10, wherein at least a second surface of said lenses of said miniature objective has a conic departure coefficient of magnitude around 1.0.

14. The miniature objective of claim 13, wherein at least a third surface of said lenses of said miniature objective has a conic departure coefficient of magnitude around 1.4.

15. The miniature objective of claim 14, wherein at least a fourth surface of said lenses of said miniature objective has a conic departure coefficient of magnitude around 2.2.

16. The miniature objective of claim 3, the field of view (FOV) being substantially 220 μm or more.

17. The miniature objective of claim 16, the outer diameter (OD) being substantially 2 mm or less, and the ratio of FOV to OD thereby being 0.11 or more.

18. The miniature objective of claim 2, the outer diameter (OD) being less than substantially 2 mm.

19. The miniature objective of claim 3, NA being more than 0.6.

20. The miniature objective of claim 2, the field of view (FOV) being substantially 240 μm or more.

21. The miniature objective of claim 3, further comprising a diffractive surface, and wherein the miniature objective is corrected over a bandwidth of more than substantially 10 nm and can operate at any center wavelength over the visible spectrum.

22. The miniature objective of claim 21, wherein the diffractive surface is disposed on the front surface of the second positive lens facing the object.

23. The miniature objective of claim 2, further comprising at least two diffractive surfaces disposed on surfaces of lenses of said objective.

24. The miniature objective of claim 3, wherein each lens comprises a low-dispersion, crown-like material.

25. The miniature objective of claim 3, wherein distortion is less than 0.5% at an extreme field position.

26. The miniature objective of claim 2, said third lens comprising a negative lens.

27. The miniature objective of claim 26, further comprising a fourth positive lens.

28. The miniature objective of claim 2, said first lens comprising a plano-convex lens, said second lens comprising a bi-convex lens, and said third lens comprising a meniscus-type lens.

29. The miniature objective of claim 28, further comprising a fourth meniscus-type lens.

30. The miniature objective of claim 28, said third lens comprising a negative lens.

31. A miniature microscope objective, comprising at least three miniature lenses with outer diameters less than 5 mm and including from object to image a first positive lens, a second positive lens, a third lens, and a fourth lens, and having a numerical aperture (NA) greater than 0.4 and no more than approximately 0.9, and wherein said objective further comprises a diffractive surface such that the miniature objective is corrected over a bandwidth of more than substantially 10 nm.

32. The miniature objective of claim 31, comprising at least four lenses.

33. The miniature objective of claim 32, wherein over said range of visible wavelengths (λ) including blue, green and red wavelengths of approximately 165 nm or more, said miniature objective having a magnification variation ΔM/M of less than substantially 1.0%.

34. The miniature objective of claim 31, said third lens of said miniature objective comprising a negative lens.

35. The miniature objective of claim 34, further comprising a fourth positive lens.

36. The miniature objective of claim 31, said first lens comprising a plano-convex lens, said second lens comprising a bi-convex lens and said third lens comprising a meniscus-type lens.

37. The miniature objective of claim 32, wherein at least one surface of said lenses of said miniature objective has a conic departure coefficient of magnitude around 1.4 or more.

38. The miniature objective of claim 37, wherein at least a second surface of said lenses of said miniature objective has a conic departure coefficient of magnitude around 2.2 or more.

39. The miniature objective of claim 32, wherein at least one surface having a conic departure coefficient of magnitude around 2.2 or more.

40. The miniature objective of claim 32, the field of view (FOV) being substantially 220 μm or more.

41. The miniature objective of claim 40, the outer diameter (OD) being substantially 2 mm or less, and the ratio of FOV to OD thereby being 0.11 or more.

42. The miniature objective of claim 32, the outer diameter (OD) being substantially 2 mm or less.

43. The miniature objective of claim 32, NA being more than substantially 0.6.

44. The miniature objective of claim 32, wherein the diffractive surface is disposed on the front surface of the second positive lens facing the object.

45. The miniature objective of claim 32, wherein the diffractive surface is disposed on the back surface of the second positive lens facing the image.

46. The miniature objective of claim 32, wherein the diffractive surface is disposed on the back surface of the third lens facing the image.

47. The miniature objective of claim 32, wherein the diffractive surface is disposed on the front surface of the fourth lens facing the object.

48. The miniature objective of claim 32, wherein a diffractive surface is disposed on the front surface of the second positive lens facing the object, the back surface of the second positive lens facing the image, the back surface of the third lens facing the image, or the front surface of the fourth lens facing the object, or combinations thereof.

49. The miniature objective of claim 32, the objective comprising at least two diffractive surfaces disposed on surfaces of lenses of said objective.

50. The miniature objective of claim 32, wherein each lens comprises a low-dispersion, crown-like material.

51. The miniature objective of claim 32, wherein the objective comprises no more than four lenses.

52. The miniature objective of claim 32, wherein distortion is maintained at less than 0.5% at an all field position.

* * * * *